(No Model.)
W. A. CLARK.
FRUIT BASKET.
No. 418,684. Patented Jan. 7, 1890.
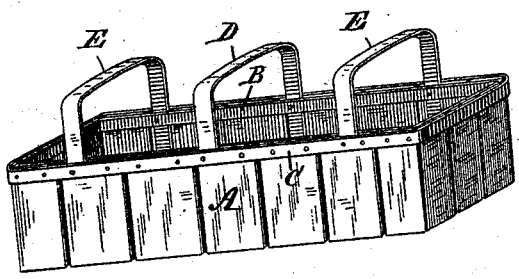
Witnesses:
John Grist
H. S. Horsey
Inventor:
William A. Clark
By Harry Grist
Attorney.

UNITED STATES PATENT OFFICE.

WILLIAM A. CLARK, OF OTTAWA, ONTARIO, CANADA.

FRUIT-BASKET.

SPECIFICATION forming part of Letters Patent No. 418,684, dated January 7, 1890.

Application filed November 18, 1889. Serial No. 330,725. (No model.) Patented in Canada October 1, 1889, No. 32,402.

*To all whom it may concern:*

Be it known that I, WILLIAM A. CLARK, of Ottawa, in the Province of Ontario, in the Dominion of Canada, have invented a certain new and useful Improvement in Fruit-Baskets, (for which I have obtained a patent of the Dominion of Canada, numbered 32,402, and dated October 1, 1889;) and I do hereby declare that the following is a full, clear, and exact description of the same, reference being had to the accompanying drawing, which represents a perspective view of my improved fruit-basket.

My invention has for its object to enable fruit to be heaped in baskets, the baskets then being capable of being piled one upon another, and when piled permitting a free circulation of air for preservation of the fruit, and also to lessen the jolting of the baskets when piled during transportation to prevent injury to the fruit.

My invention consists of a basket, preferably of an oblong rectangular shape, having the ordinary curved handle across the middle and secured to opposite sides, and two bows of uniform height fixed between the handle and ends of the basket.

The body A of the basket, for cheapness, is preferably made of wood-veneer slats crossed at the bottom of the basket, and the ends of the slats secured to an inner hoop B and an outer hoop C; or the basket may be of other suitable construction.

D is a handle connecting opposite sides of the body A at the middle, and stands sufficiently high to allow the basket to be heaped with fruit.

E E are bows curved over the top of the body A, the ends preferably bearing on the bottom and secured in an erect position to the sides. The bows are of uniform height with the handle and located between the handle and opposite ends of the basket, whereby said bows will sustain similar baskets piled one upon the other.

The bows E E, while allowing the basket to be heaped with fruit and sustain other like baskets, also prevent the baskets being so closely placed together as to exclude circulation of air, but allow ventilation for preservation of the fruit.

The bows E E have flexibility, which lessens the jolting of the baskets piled thereon during transportation, and thus conduce to the fruit being marketed in the best condition, whereby the highest price will be obtainable.

I claim as my invention—

1. A basket comprising a body A, having a curved handle D across the middle, bows E E of uniform height with the handle and fixed to opposite sides of the basket, between the handle and the ends, and adapted with the handle to sustain other like baskets piled one on top of another, for the purposes set forth.

2. The combination, with the basket A, having a bent handle D, of the correspondingly-bent bows E E, fixed to opposite sides of the basket and parallel to the handle, as set forth.

WILLIAM A. CLARK.

Witnesses:
JOHN GRIST,
H. H. HORSEY.